Dec. 6, 1955    D. A. ROSS    2,725,702
STALK CHOPPING AND SHREDDING DEVICE
Filed May 14, 1953    3 Sheets-Sheet 1
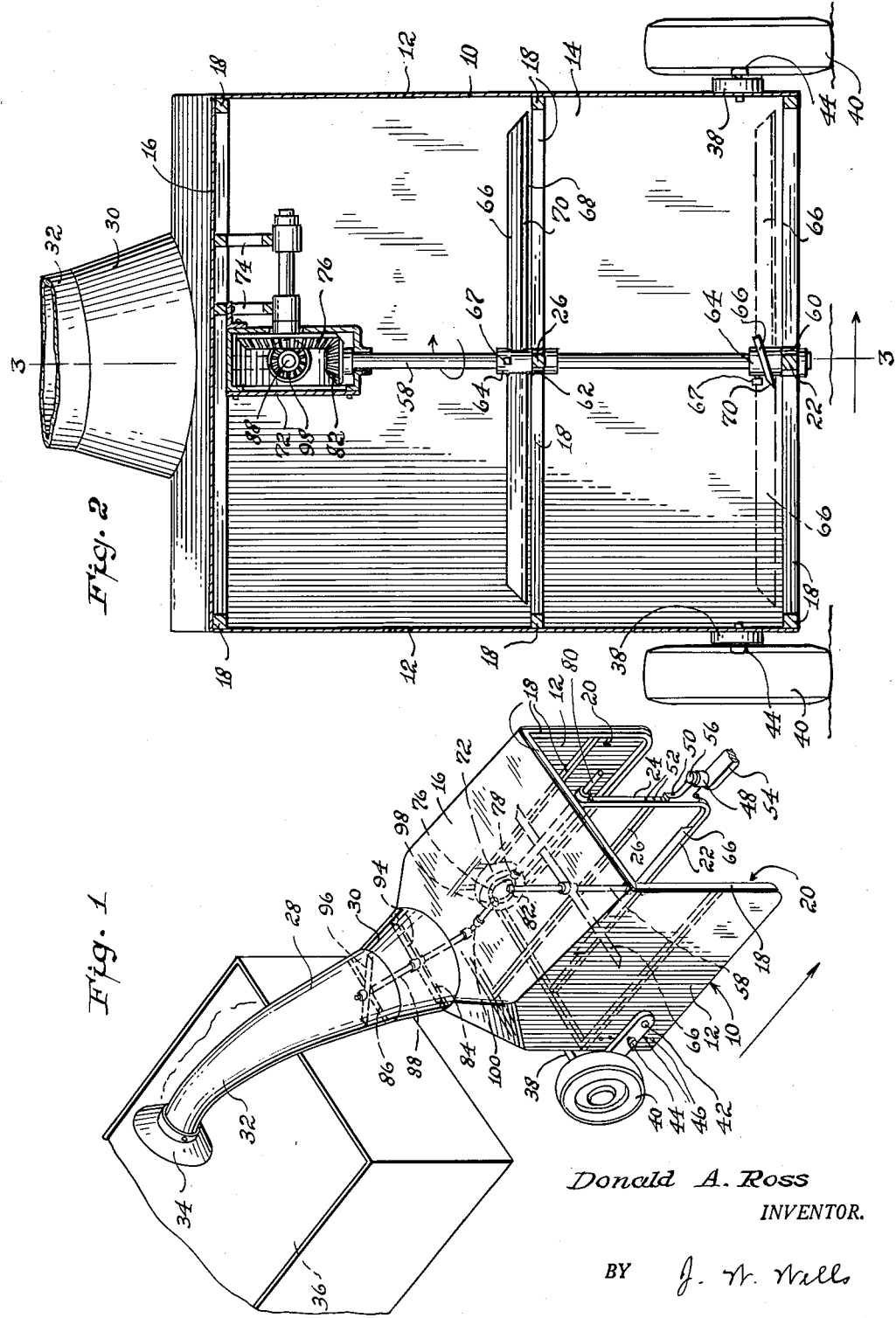
Donald A. Ross
INVENTOR.
BY  J. W. Walls
ATTORNEY Dec. 6, 1955  D. A. ROSS  2,725,702
STALK CHOPPING AND SHREDDING DEVICE
Filed May 14, 1953  3 Sheets-Sheet 2
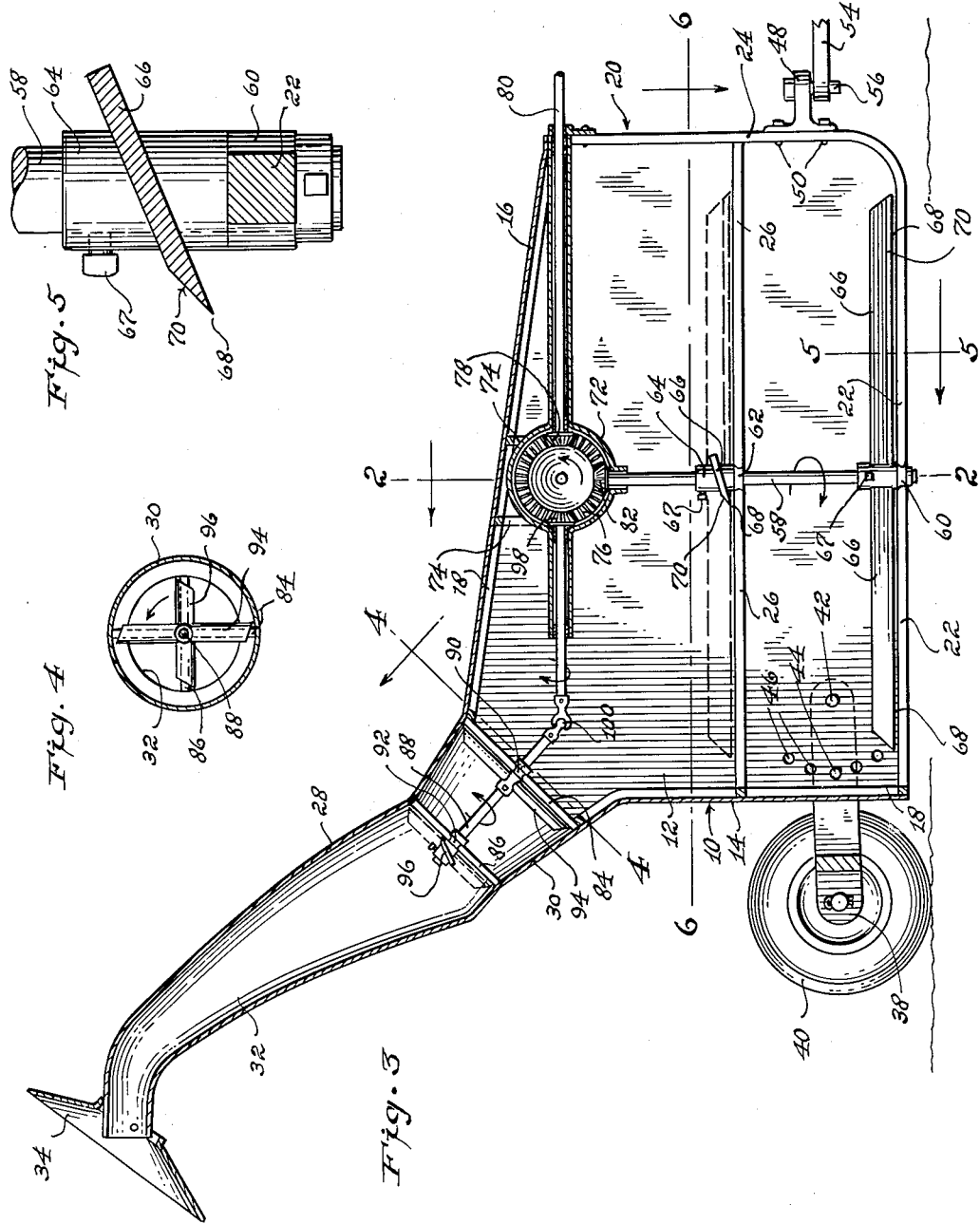
Donald A. Ross
INVENTOR.
BY J. W. Mills
ATTORNEY

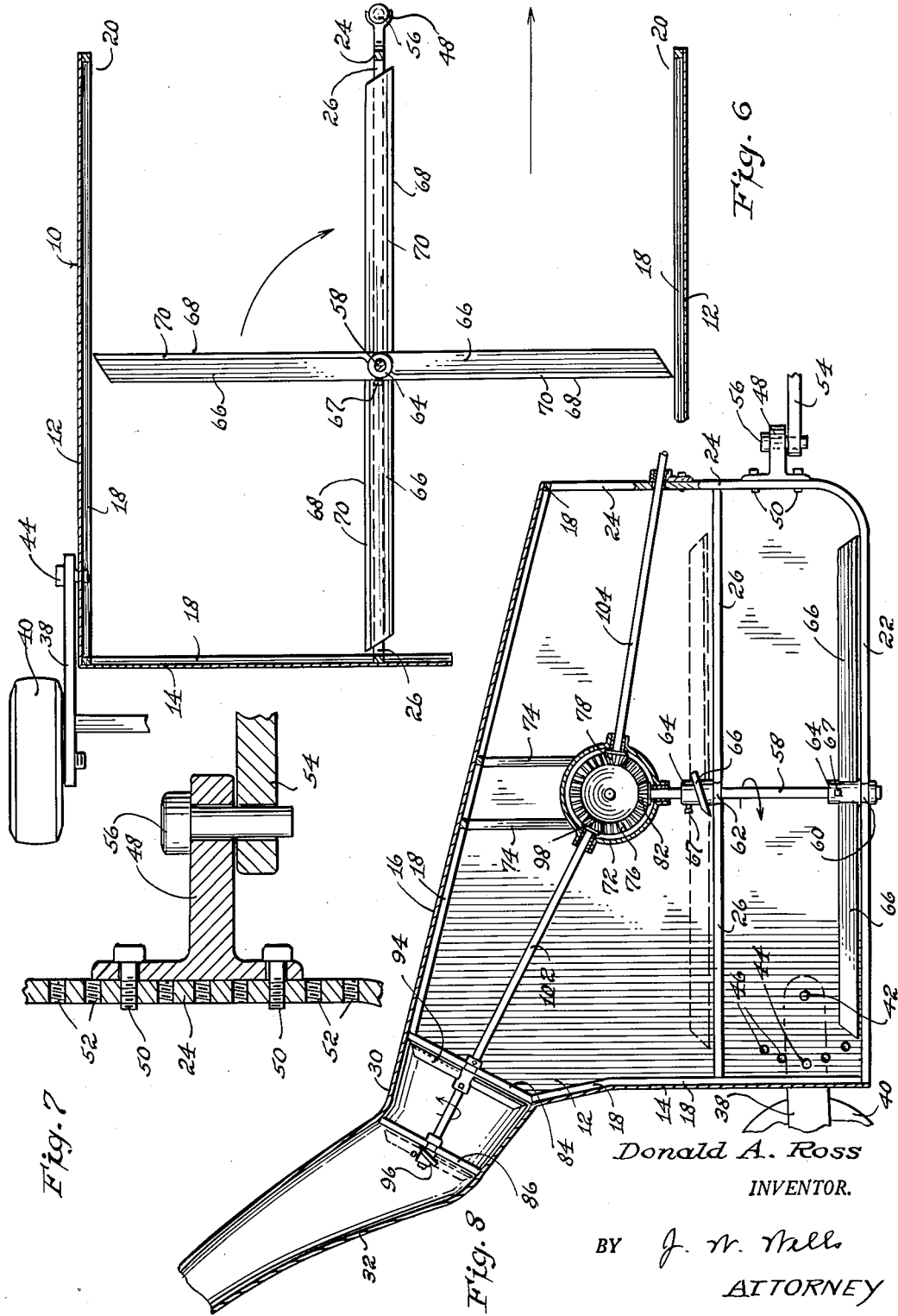

United States Patent Office 2,725,702
Patented Dec. 6, 1955

2,725,702

STALK CHOPPING AND SHREDDING DEVICE

Donald A. Ross, Edinburg, Tex.

Application May 14, 1953, Serial No. 355,081

2 Claims. (Cl. 55—118)

This invention relates to ensilage cutting, conditioning and handling, consisting generally of cutting the ensilage stalks from rows or broadcast areas, chopping up and/or shredding the stalks and conveying the conditioned material into a trailer or other truck bed to be transported to a place of storage.

In previous types of machines and equipment for cutting and handling ensilage, separate and relatively expensive units have been provided for cutting, chopping or shredding and conveying the ensilage into the trailer bed. In some machines separate motors are provided for the different units. Moreover, still additional units have been provided for picking up previously cut stalks from windrows on the ground.

Therefore, one of the principal objects of the present invention is to provide an improved ensilage harvester in which all the operations of cutting, chopping, shredding and conveying the conditioned ensilage material into a trailer or other truck bed is performed by a plurality of instrumentalities of similar construction and arrangement and operated through a central transmission unit having connection with a tractor motor or other suitable source of power.

Another object of this invention is to provide an improved ensilage harvester of the character mentioned which within itself is capable of cutting the stalks from rows or from broadcast areas, chopping up and shredding the stalks and during the same operation conveying the conditioned material into a vehicle bed for transportation to a place of storage.

A further object of the invention is to provide an ensilage harvester of the character mentioned which is also capable of picking up previously cut stalks from windrows and performing on such stalks the same operations as those mentioned above.

A still further object of this invention is to provide an ensilage harvester of the character mentioned in which the cutting instrumentalities are vertically adjustable in relation to the ground.

In the carrying out of my invention I have found that a plurality of combination rotary cutter and fan units suitably arranged in a portable housing and driven at a relatively high rate of speed will efficiently perform all the necessary operations of cutting or picking up ensilage from the ground and also chopping, shredding and conveying the conditioned material into a truck bed, without the use of separate cutters, choppers, shredders, conveyors or power units. I have further found that all of the combination cutter and fan units can be driven by a single transmission gear connected to the motor of a tractor to which the housing is attached for propulsion thereof along the ground.

I am aware that combination rotary cutters and fans have previously been used in lawn mowers for cutting grass and blowing the grass from the housing in which the elements were mounted.

Further objects and advantages of my invention will be apparent from the following specification in which reference is had to the accompanying drawings illustrating certain embodiments of my invention and in which—

Fig. 1 is a perspective view of one form of my improved ensilage harvester;

Fig. 2 is transverse section taken on the line 2—2 of Fig. 3;

Fig. 3 is a longitudinal section taken on the line 3—3 of Fig. 2;

Fig. 4 is a section taken on the line 4—4 of Fig. 3;

Fig. 5 is an enlarged detail section taken on the line 5—5 of Fig. 3;

Fig. 6 is a section taken on the line 6—6 of Fig. 3;

Fig. 7 is an enlarged detail view of the draw bar coupling; and

Fig. 8 is a horizontal section of a modified form of ensilage harvester construction in accordance with my invention.

Referring to the drawings in which like numerals designate like parts in the several views, 10 designates a housing having side walls 12, a rear end wall 14, and a roof 16, the latter being preferably inclined upwardly toward the rear of the housing, as shown in Figs. 1, 3, and 8, for a purpose hereinafter explained. The walls and roof may be made of sheet metal or other suitable material mounted on frame bars 18. This housing is open at its bottom and front, as indicated at 20. In plan formation the housing is approximately square. A bar 22 extends horizontally and centrally of the housing 10 from a frame bar at the rear to the front of the housing where it is joined to a central vertical bar 24, either by continuous extension, as shown, by welding, bolting or other suitable means. The bottom edge of the bar 22 substantially coincides with the bottom edges of the walls 12 and 14. Another bar 26, located above the bar 22, in the intermediate portion of the housing 10, also extends horizontally and centrally from the rear to the front of the housing 10 where it also is joined to the vertical bar, by welding or bolting the two rigidly together.

A discharge pipe 28 extends rearwardly from the upper portion of the housing 10. It comprises a section 30 adjacent the housing and an elongated reduced section 32 provided at its rear end with a conventional deflector 34 for directing discharged material into a trailer or other truck bed 36.

A wheel supporting frame 38, in which wheels 40 are journaled, is pivotally mounted at 42 on each of the side walls 12 at the rear of the housing 10. This frame is held in vertically adjusted position by pins 44 which are insertable in openings 46 in the walls 12. A draw bar coupling 48 is mounted on the vertical bar 24 and is rigidly held thereon in vertically adjusted position by bolts or screws 50, which are insertable in either of the threaded openings 52 in the vertical bar. A draw bar 54, carried by a tractor (not shown) is detachably connected to the coupling 48 by a pin 56.

In Figs. 1 to 7, the instrumentalities for cutting the stalks from the ground, either from rows or broadcast areas, or picking up previously cut stalks from windrows on the ground, chopping and shredding the stalks and conveying the conditioned ensilage material into the truck bed 36 comprise combination cutter and fan units including a vertical shaft 58 journaled in bearings 60 and 62 on the horizontal bars 22 and 26. Each unit includes a hub 64 and a pair of radial, diametrically alined blades 66 carried by said hub, and secured by a set screw 67. Each blade, in cross-section, is arranged at approximately an angle of 30 degrees with a horizontal plan, inclined downwardly toward its forward edge, with respect to direction of rotation, of the blade. Each blade is provided with a cutting edge 68 on its forward portion, and each blade may also be provided with a beveled portion 70 inclined toward the edge of the blade. Also, each blade is arranged slightly above its adjacent horizontal bar to provide shearing means cooperative with said blades. A differential or transmission gear casing 72 is attached to the roof of the housing 10 by hangers 74 or other suitable means. A differential or transmission gear 76 is journaled in the casing 72.

Another gear 78 is connected with the gear 76 and is mounted on a horizontal shaft 80, which later extends forwardly beyond the housing 10 and is connected to the motor (not shown) of a tractor. A gear 82 on the upper end of shaft 58 connects said shaft with the differential gear 76, to effect rotation of the shaft and the cutter and fan units fixed on said shaft.

A pair of spaced bars 84 and 86 is fixed centrally across the respective ends of section 30 of the discharge pipe 28. A shaft 88 is journaled in bearings 90 and 92 on said cross bars; and fixed on said shaft, slightly outwardly from the respective bars, are combination cutter and fan units 94 and 96, the construction of these units being in all respects similar to the corresponding units in the housing 10, except of smaller diameter. The shaft 88 is connected with the differential gear 76 by means of a gear 98 on the shaft 88. As shown in Fig. 3 the shaft 88 extends at an angle with shaft 80, and is, therefore, provided with a universal joint 100.

However, as illustrated in Fig. 8, it will be seen that by lowering the differential gear casing 72 the shaft 102 on which the cutter and fan units 94 and 96 are mounted will extend in a straight line to the transmission gear 76 without the necessity of a universal joint. In this form of the invention the shaft 104, extending from the transmission gear 76 to the tractor motor (not shown) is also lowered in the housing, so that it will extend directly to the power take-off of the tractor (not shown).

For stalks of ensilage of different heights the housing 10 can be vertically adjusted at both front and rear, thus also vertically adjusting the height of the cutter and fan units 66 in relation to the ground.

In operation it is necessary only to couple the housing 10 to a tractor draw bar and connect the shaft 80 (or 104) to the power take-off of the tractor. The housing is then drawn or propelled over the stalks of silage and the combined cutters and fans cut the stalks, chop and shred them and discharge the conditioned material through the discharge pipe into the bed of the trailer truck. With the cutter and fan units rotating at relatively high speed the cutters in both the housing 10 and the discharge pipe section 30 instantly shred any clogging masses, and the fan elements then blow the material on through the housing and discharge pipe. Therefore, no auxiliary cutters, shredders or conveyors are needed to render the ensilage into suitable condition for storage or to convey the material into a vehicle bed. As previously explained, the roof 16 is upwardly inclined toward the rear of the housing 10 and this facilitates the flow of air pressure from the blades 66 toward the discharge pipe 28 and forcing the ensilage in that direction.

The cutter and fan units can be lowered, through the adjustment arrangements at the front and rear of the housing to an extent necessary to enable the lower cutter and fan unit in the housing to pick up previously cut stalks from windrows. The inclination of the blades cause the ensilage to be violently blown upwardly into the upper cutter and fan unit, where it is chopped and shredded, and blown onward into the cutter and fan unit in the inlet of the pipe 28. Thence it is blown into the last cutter and fan unit where it is sufficiently cut and shredded to facilitate its discharge from the pipe 28. The beveled portions 70 on the blades aid in the initial lifting of the stalks from the ground, although the inclination of the blades also facilitate such lifting of the stalks.

It will be seen that the speed of rotation of both pairs of combination cutters and fans can be varied by changing the gear 78 on the shaft 80 (or 104) and the speed of rotation of any individual pair of cutters and fan can be varied by changing the gears 82 or 92.

Although my improved ensilage harvester has been described as having a pair of combined cutter and fan units in the housing 10 and a pair of similar units of smaller diameter in the discharge pipe 28, it may be advisable for some types of ensilage to provide additional cutter and fan units in either the housing or the discharge pipe, or in both. Moreover, it is obvious that various other modifications in the construction of my improved ensilage harvester may be made without departing from the spirit and scope of my invention. For example, various arrangements of the means for mounting and driving the cutter and fan units can be employed within the principle of the apparatus. Therefore, it should be understood that the embodiments of my invention shown and described are intended to be illustrative, only, and not limited to such construction.

I claim:

1. An ensilage harvester comprising, in combination, a wheeled housing closed except at its bottom and front, the upper portions of the walls of said housing converging outwardly and merging into a discharge pipe extending rearwardly from the upper portion of said housing, a pair of combination rotary cutter and fan units centrally journaled in said housing, one of said units being located in the bottom portion of said housing and the other being located above said first mentioned unit in the intermediate portion of said housing, and a third combination rotary cutter and fan unit journaled in the entrance of said discharge pipe, each of said units comprising radial blades, each of said blades being provided with a forward cutting edge and declined toward said cutting edge, a shearing bar disposed in a plane parallel with and closely adjacent the blades of each unit, the blades of all of said units being relatively arranged to chop and blow ensilage from the bottom of said housing outwardly through said housing and discharge pipe; and common power means for simultaneously rotating the blades of all of said units.

2. An ensilage harvester according to claim 1 in which the shearing bars in said housing extend centrally from the rear of said housing to the front thereof and are joined at their front ends to a vertical bar attached to said housing.

References Cited in the file of this patent

UNITED STATES PATENTS

| Number | Name | Date |
|---|---|---|
| 2,188,522 | Alfs | Jan. 30, 1940 |
| 2,333,901 | Swenson | Nov. 9, 1943 |
| 2,477,794 | Gehl | Aug. 2, 1949 |
| 2,579,013 | Sampson | Dec. 18, 1951 |
| 2,612,017 | Jarmin | Sept. 30, 1952 |
| 2,649,678 | Sishc | Aug. 25, 1953 |
| 2,659,188 | Haban | Nov. 17, 1953 |